United States Patent [19]

Berthold et al.

[11] Patent Number: 4,704,531

[45] Date of Patent: Nov. 3, 1987

[54] METHOD AND APPARATUS FOR MEASURING THE RADIOACTIVITY IN COLUMN ELUATES

[75] Inventors: Fritz Berthold, Pforzheim; Manfred Pfleger, Wildbad-1, both of Fed. Rep. of Germany

[73] Assignee: Laboratorium Prof. Dr. Rudolph Berthold, Wildbad, Fed. Rep. of Germany

[21] Appl. No.: 639,153

[22] Filed: Aug. 9, 1984

[30] Foreign Application Priority Data

Dec. 8, 1983 [FR] France ................................ 3329133

[51] Int. Cl.⁴ .............................................. G01T 1/20
[52] U.S. Cl. ..................................... 250/328; 250/364
[58] Field of Search .................. 250/328, 461.2, 461.1, 250/458.1, 363 R, 364

[56] References Cited

U.S. PATENT DOCUMENTS 4,194,117 3/1980 Gross ................................ 250/328

FOREIGN PATENT DOCUMENTS 1305972 2/1973 United Kingdom .
1417560 12/1975 United Kingdom .

OTHER PUBLICATIONS

L. Schutte, "Continuous Detection of Radioactive Effulents in Liquid Chromatography by Heterogeneous or Homogeneous Scintillation Counting", *Journal of Chromatography 72 (1972) pp. 303–309.*

Radiomatic Instruments & Chemical Co., Inc., Brochure 120/681 (1981).

*Primary Examiner*—Janice A. Howell
*Attorney, Agent, or Firm*—Armstrong, Nikaido, Marmelstein & Kubovcik

[57] ABSTRACT

A method for measuring the radioactivity in eluates from liquid chromatography columns in which a portion of the eluate stream is split off and mixed with a scintillation fluid in a timed sequence wherein the volume of eluate and the volume of scintillation cocktail are quantitatively and reproduceably controlled. An apparatus for the practice of this method comprising a two-position valve on the affluent stream, a two-position valve on a pumped closed loop of scintillation cocktail a means for simultaneously setting the position of each valve and a mixing chamber discharging to a scintillation counter is also described. By the practice of this method, it is possible to determine the radioactivity of the eluate as well as to preserve a sample of the eluate for further analysis.

15 Claims, 1 Drawing Figure

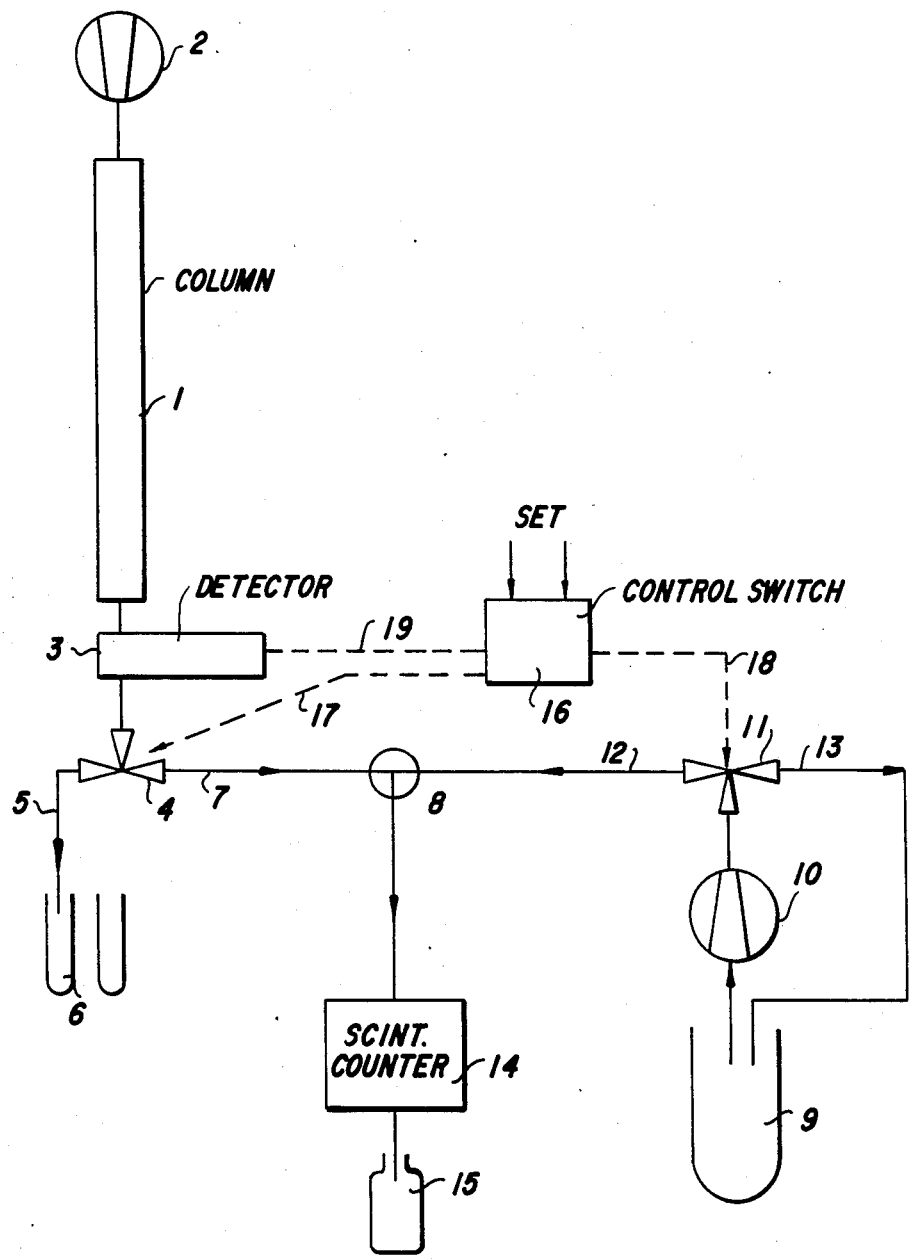

METHOD AND APPARATUS FOR MEASURING THE RADIOACTIVITY IN COLUMN ELUATES

BACKGROUND OF THE INVENTION

1. Field of the Invention:

This invention relates to a method for continuously or periodically determining the radioactivity of eluates from a liquid chromatography column and to an apparatus by which this determination may be implemented. More particularly, it relates to a method for adding, quantitatively, small volumes of scintillation cocktail to eluates from liquid chromatography columns, and it is specifically adapted to the determination of the radioactivity in eluates from high pressure liquid chromatography columns. Additionally, this method allows the simultaneous determination of radioactivity and the preservation of aliquots of the eluate for analysis by other means which cannot be performed in the presence of scintillation cocktail solutions.

2. Background of the Invention:

Radioactive isotopes are frequently used in chemical and biochemical laboratory experiments to determine the mechanism of reaction, the rate of reaction, the structure of a particular chemical species, and the identity of physiologically-active cellular receptors. Analytical techniques involving the use of radioisotopes have broad applications in both research and process control. Radioisotopes are particularly useful for the determination of nanogram and smaller amounts of material not normally measurable by other techniques.

The separation of chemical and especially biochemical components in solution by elution from a packed column containing inert adsorbants is a well practiced art. Typically, aliquots of the eluate were collected on the basis of color, absorbance of ultraviolet radiation, or time. When one or more components also contained a radioactive isotope, the aliquots could be further identified on the basis of this radioactivity, typically by mixing the eluate with a known volume of scintillation cocktail and counting the activity in a scintillation counter. The automation of such a process, whereby the ultraviolet absorbance and the radioactivity of the eluates can be determined is particularly advantageous when the elution time is measured in hours or is performed overnight. An automated system for such measurement is described in Schutte (*J. Chromatogr.*, 72 303 (1972)) and a variation is described in U.S. Pat. No. 4,194,117 to Gross, issued Mar. 18, 1980.

High pressure liquid chromatography is an improvement over traditional liquid chromatography characterized by the ability to analyze small volumes of solution at comparatively higher flow rates by the use of a high pressure pump to supply the solvent to the column. Typical analytical high performance liquid chromatography instruments provide for the analysis of microlitre quantities of solution and employ stainless steel capillary tubing and small volume columns. While the automated systems described above are suitable for large volume systems, typically those in which the solutions are delivered via a peristaltic pump through flexible plastic tubing, analytical high pressure liquid chromatographs require finer control of the amount of scintillation cocktail added to the eluate because of the small volume of sample employed. In the analysis of many biological systems, it is frequently necessary to measure, in addition to the above, the sedimentation rate or the isoelectric point of proteins or to purify the material in the eluate for further use. The principle of eluate stream diversion at timed intervals consists of diverting the eluate stream for a time interval $T_1$, and passing the stream to a collector, such as a fraction collector, for a time interval $T_2$. The ratio of the mean flow volumes is obtained by averaging the flow rate over an operating cycle $T_1 + T_2$ is approximated by the ratio of the interval durations of the two phases of the operating cycle, VLZ $T_1/T_2$. A device for performing such a timed split is that described in Radiomatric Instruments and Chemical Co. Inc. brochure 120/681. Under such conditions, the volume of scintillation cocktail required for reproduceable results becomes quite small and must be delivered at high pressure. Continous flow systems typically do not allow adequate volume control or mixing, and are wasteful of scintillation cocktail. Pumps operating at the requisite low flow rates of 0.2 ml/min are frequently inaccurate and difficult to calibrate. There exists, therefore, a need for an automated system adaptable to a high pressure liquid chromatograph which provides for both the continuous or instantaneous identification of the radioactive components of the eluate and for the preservations of aliquots of the eluate for further analytical work with as little waste of materials as possible.

SUMMARY OF THE INVENTION

The present invention provides a method for measuring the radioactivity in eluates from a liquid chromatography column whereby eluate is split off from the main eluate stream and mixed with a controlled volume of scintillation cocktail in which the volume of eluate removed and the volume of scintillation cocktail added to the eluate are determined by the time during which the eluate stream and scintillation cocktail are pumped into a mixing zone, and more particularly characterized by the control of these valves by a device which responds to either time or a measurement of some property of the eluate. The invention also consists of an apparatus for accomplishing the method of the invention consisting of a detector for the absorbance of infared, visible or ultraviolet light, a two position, two or three-way valve in the eluate stream immediately downstream from the detector, said valve under the control of a switching means, a fraction connector fed by one side of the above-mentioned three-way valve and also under the control of said switching means, a reservoir for scintillation cocktail, a pump to deliver scintillation cocktail, a mixing chamber of minimum volume, a scintillation counter positioned downstream from the mixing chamber and the necessary connecting tubing. The pump may deliver scintillation cocktail directly to the mixing zone, or may be part of a closed loop including the reservoir and a two or three-way valve. The switching means described may consist of any electronic, pneumatic or hydraulic device capable of accepting input from a clock or detector and capable of controlling said valves and may also be adapted to provide other output signals as required for proper recordation of the output signals from the eluate detector and scintillation detector or for controlling other functions related to the collections and analysis of the eluate.

The method of this invention provides for the routine and automatic characterization of the eluate from a liquid chromatography column by absorbance of light, for provision of aliquots of the eluate which are otherwise uncontaminated and for the mixing of other aliquots of the eluate with scintillation cocktail of known volume for the determination of the radioactivity of the eluate traction. The method and apparatus described are particularly adapted to high pressure liquid chromotographys and to the analysis of very small volumes of eluate on a quantative basis.

BRIEF DESCRIPTION OF THE DRAWINGS

An apparatus suitable for implementing the method of this invention may be visualized by reference to the drawings;

FIG. 1 illustrates an arrangement whereby aliquots of eluate from a liquid chromatography column may be taken on a controlled basis and mixed with a known volume of scintillation cocktail drawn from a continuous pumped loop and counted in a scintillation counter.

DETAILED DESCRIPTION OF THE INVENTION

Chemical reaction products and particularly laboratory preparations of physiologically active materials normally contain a number of distinct chemical components. These components can be separated on the basis of their rate of migration through a bed of solid (usually inert) adsorbents in the presence of a flowing stream of solvent. Particularly effective separations are achieved when the polarity of the solvent is changed over time. As the chemical components migrate through the adsorbant bed, they are physically separated and ultimately elute at different times, and frequently, in different solvent systems. An initial determination of the presence of, and occasionally of the identity of, the eluted component can be obtained by passing visible or ultraviolet light through the stream of eluate. While such a method of detection may be sufficient for identification when the components to be separated exhibit absorbance peaks which are determinative of their identity, the more normal situation involves separations of closely related chemicals, e.g., steriods, which have broad and closely related absorbance peaks. Furthermore, it is usually preferred that an adsorbance peak be chosen which is characteristic of all of the desired eluted components so that the elution time for each component can be determined. If a radioactive isotope is used to identify one or more specific components as, for example, in the identification and separation of receptor proteins, a further determination of radioactivity is ultimately required. Preferably, not only the existence of activity but a measurement of the specific activity is desired. To determine the latter, it is necessary that the volume of eluate be mixed with a known and consistent volume of scintillation cocktail when the isotope to be determined is an alpha or beta emitter. When the volumes of eluate are comparatively large, as in low pressure chromatography systems, proportionately small changes in the flow rate of the eluate or the flow rate of the scintillation cocktail is not of great significance. When it is necessary, however, to determine the specific activity of small volumes of eluate or when it is desired to split the eluate smaple between aliquots to be saved and aliquots to be analyzed, manual controls and the pulsing of a pump driving the scintillation cocktail into the mixing chamber can create unsatisfactory differences in the determination of specific activity. The latter is particularly important when the eluate is obtained from a high pressure liquid chromotograph because the volume of eluate to be analyzed is small and low volume, high pressure pumps do not deliver reproducable volumes of liquid upon demand when they are regularly turned on and off.

This invention provides a method whereby known volumes of eluate can be mixed with known volumes of scintillation cocktail in a reproducable manner and additionally provides a method whereby companion aliquots of eluate ("split-samples") can be obtained for further analysis. The method of this invention requires a method for diverting the flow of the eluate to a mixing chamber or to a staged fraction collector under the control of a signalling device and the cotemporal introduction of scintillation cocktail during those times only when the eluate is directed toward the mixing chamber. The flow of the scintillation cocktail is controlled by switching the pump on and off or by a three-way valve in a continuously pumped loop fed from a reservoir of scintillation cocktail. The pump or valve in the scintillation cocktail loop is under the same control as is the three-way valve in the eluate discharge system so that scintillation cocktail and eluate are pumped together for a preset period of time so that known volumes of each are mixed. When the flow of eluate is shunted to the collection system, the flow of scintillation cocktail is stopped. The times at which the eluate and cocktail are mixed may be determined on the basis of elution time (i.e. present time) or upon some other signal such as output from a visible or ultraviolet detector situated at the outflow side of the column. When the eluted band is broad, requiring several seconds to flow out of the column, several samples may be analyzed and several preserved by rapid shunting of the eluate stream.

An apparatus for the implementation of this method is illustrated in FIG. 1. The eluate is pumped in known fashion through a separating column 1 with the aid of a high pressure pump 2 and is then passed through a detector 3. In a preferred embodiment, the detector 3 measures absorbance of infared, visible or ultraviolet light. The eluate is split by an automatically operated valve 4 which, in the preferred embodiment, is a two-position three-way valve, although valving systems which split the flow into two streams in one of the operative positions are also envisioned. In one position of valve 4, all of the flow is directed through tube 5 to a collector 6 which may be a single collection vessel or a number of collection tubes in a sequenced fraction collector. In the other position of valve 4, all or part of the flow is directed through tube 7 to mixing chamber 8. Reservoir 9 contains a scintillation cocktail, which in one embodiment, consists of a solvent, usually toluene or dioxane and a chemical scintillant and may include other ingredients such as detergents. When a closed loop is employed, the scintillation cocktail from reservoir 9 is pumped through pump 10 to valve 11. Valve 11 is, in this embodiment, a two-position, three-way valve which directs scintillation cocktail to either tube 12, which leads to the mixing chamber 8 or tube 13, which returns scintillation cocktail to reservoir 9. As in the case of valve 4, valve 11 may, in one position, direct all of the flow to tube 13 and in an alternative position, direct some of the flow to tube 12 and some to tube 13. Scintillation cocktail and eluate mixed in mixing chamber 8 are directed under pressure to scintillation counter 14 which in the preferred embodiment, is a coincidence counter consisting of photomultiplier tubes, an electronic coincidence circuit, and additional circuits providing an analog or digital output. The effluent from counter 14 is collected in vessel 15.

The positions of valves 4 and 11 are controlled by control switch 16 which, in the preferred embodiment, is an electronic controller driving solenoids which control valves 4 and 11. However, other control methods used in the process controls industry such as pneumatic and hydraulic controls are included within the concept of this invention. Controller 16 may be set to control the setting of valves 4 and 11 based on elapsed time only or in response to a signal from detector 3 via connector 19 or from the scintillation counter (connection not shown in the drawings).

In operation, whenever valve 4 is in a position to deliver eluate to tube 5 so that all of the eluate passes to receiver 6, valve 11 is simultaneously in position to deliver all of the stream of scintillating cocktail back to reservoir 9. Whenever valve 4 is set to deliver all or part of the eluate to tube 7, valve 11 is open to direct all or part of the scintillation cocktail fluid through tube 12, resulting in a mixing of eluate and cocktail in mixing chamber 8 and subsequent flow to counter 14.

In a normal timed operation, wherein the valves are switched on the basis of time from the start of the separation (on the basis of the time at which the sample is injected into the system between column 1 and pump 2), the system operates under two modes. During $T_1$ of the operating cycle, the entire eluate stream where a portion thereof is directed to the mixing chamber 8 and mixed with scintillation cocktail. During $T_2$, no eluate is directed toward the mixing chamber and no scintillation cocktail is directed via tube 12 to chamber 8. The length $T_1+T_2$ of an operating cycle and the ratio $T_1/T_2$ of the durations of the phases of the operating cycle may be individually set (or controlled) according to the particular application conditions encountered. These conditions may be set manually in accordance with properties of the eluate undergoing measurement. As a rule, the starting point is to choose the period $T_1+T_2$ of an operating cycle to be as short as possible relative to the half width of the radiation peak in the eluate stream, while at the same time, taking into account the equipment service life and the inertial limitations on the speed of switching as the interval $T_1+T_2$ becomes very short (i.e., frequency $(T_1+T_2)^{-1}$ becomes very high). Values employed in practice are in the vicinity of $T_1+T_2=1$ sec. and $T_1/T_2=1/9$.

If it is desired to measure a radioactive substance in the measuring cell over a relatively long residence time therein, in order to achieve improved statistical accuracy, the mixture of the scintillating liquid and eluate may be held in the "stopped-flow" (i.e., no-mixing) state, by interrupting or suspending the timed sequential operation, such that the entire eluate stream is passed into the receiver 6 and none of the scintillating liquid stream is mixed in. This interruption may be brought about by an external signal feed to controller switch 16 from detector 3, by a signal from counter 14 (via a connection not shown) and based upon a certain number of counts per minute or by a simple lapse of the prescribed initial $T_1$ following the start of measurement as, for example, when a large amount of radioactivity is known to be coming forth in an early fraction.

A delay time $T_v$ may be provided between the occurrence of the first time interval control signal and the initiation of the "stopped-flow" state of the mixture. This option, as well as the length of the delay time $T_v$ chosen will depend upon the origin of the control signal. In the case of a control signal from detector 3, for example, $T_v$ will correspond to the time difference between detection of an eluate component in the monitor 3 and the entrance of said component into the measuring cell.

The return switching into the timed sequential operating state may be brought about by suitable means, e.g., by the lapse of a prescribed "second time interval" following the beginning of the stopped flow state or by a second signal from monitor 3, which signal indicates the appearance of a second eluate component. The way in which this second signal from monitor 3 is processed depends on whether the system is to be returned immediately to the timed sequential operating state or whether the second detected eluate component is also to be measured in the stopped flow state. In both cases, the system is switched back directly to the timed sequential operating state, and in the second case as described above, this occurs after the lapse of a delay time $T_v$.

When a sampled eluate fraction contains high activity and is routed through detector 14, or when there is a long delay between eluate fractions to be counted, such as that described above, it may be desirable to purge the measuring cell. This may be achieved by suitable dimensioning of the measuring cell and tubing system, thereby interposing a separate purging step. This purging may comprise passing the entire scintillating liquid stream through the measuring cell for a time, namely, until the analysis sample stream containing the second detected component reaches mixer 8. At low signal frequencies $(T_1+T_2)$ the valve 11 may be dispensed with, and instead pump 17 may be switched on and off at timed intervals, whereby the scintillating fluid is pumped only when valve 4 is in direction to deliver eluate to tube 7. If this embodiment is only preferred when relatively small volumes of eluate are to be saved in collector 6.

What is claimed is:

1. A method for measuring the radioactivity in aliquots of the eluate from a liquid chromatograph comprising:
    (1) diverting to a mixing zone all or part of the eluate stream from a chromatography column for at least one time period which is less than the total time during which at least one compound is passed through said column;
    (2) coincidentally delivering to said mixing zone a controlled amount of liquid containing a scintillant; and
    (3) determining the activity of the mixed stream as it flows through a scintillation counter;
    wherein the means for directing aliquot of eluate and liquid containing scintillant to the mixing zone are synchronized by a controller in a timed sequence.

2. The method of claim 1 in which liquid containing scintillant flows to the mixing zone only when eluate flows to the mixing zone.

3. The method of claim 2 in which the liquid containing scintillant is pumped in a closed loop containing a reservoir, pump and valve, and the flow of liquid containing scintillant to the mixing zone occurs only when the valve is in one of two or more positions.

4. The method of claim 1 in which the times of mixing and the times of unmixed flow are externally adjustable.

5. The method of claim 1 in which the beginning of liquid flow to the mixing zone is controlled by an external signal.

6. The method of claim 5 in which the external signal is derived from a measurement of the radioactivity of the mixture of eluate and liquid containing scintillant.

7. The method of claim 1 in which the time period for eluate flow into the mixing chamber is determined by a preset time.

8. The method of claim 1 in which the time period for eluate flow to the mixing zone is controlled in response to a signal from a device capable of detecting the absorbance of infrared, visible or ultraviolet light, which detector is situated between the chromatography column and the means diverting flow of the eluate to the mixing zone.

9. An apparatus for measuring the radioactivity in a portion of the eluate from a liquid chromatograph comprising:
 (1) a means for diverting all or part of the eluate to a mixing zone;
 (2) a means for directing all or part of the flow of liquid containing scintillant from a pumped, closed loop to the aforementioned mixing zone;
 (3) a scintillation counter situated at the downstream side of said mixing zone; and
 (4) a control device for said means directing eluate flow and said means directing flow of liquid containing scintillant.

10. An apparatus according to claim 9 wherein said control device allows the operation of said means for directing liquid containing scintillant to the mixing zone only when said means of directing eluate flow is directing eluate to the mixing zone.

11. An apparatus according to claim 9 in which the means for directing eluate flow and the means for directing flow of liquid containing scintillant are activated according to a timed sequence.

12. An apparatus according to claim 9 wherein the means for directing the eluate flow and the means for directing flow of liquid containing scintillant are activated in response to an external signal.

13. An apparatus according to claim 9 wherein said controlling means is additionally employed to start and stop the pump circulating liquid scintillant.

14. The method of claim 1 in which the liquid chromatograph is a high pressure liquid chromatograph.

15. In a method for determining the radioactivity of one or more portions of the eluate from a liquid chromatograph by splitting the flow of eluate and mixing said eluate with liquid scintillation cocktail before passage through a scintillation counter, the improvement of drawing liquid scintillation cocktail from a high pressure pumped loop only at such times during which the flow of eluate is diverted to the mixing zone.

* * * * *

UNITED STATES PATENT AND TRADEMARK OFFICE
CERTIFICATE OF CORRECTION

PATENT NO. : 4,704,531

DATED : November 3, 1987

INVENTOR(S) : BERTHOLD et al

It is certified that error appears in the above-identified patent and that said Letters Patent is hereby corrected as shown below:

```
on the cover page, Item [30], line 2 should read:
--Aug. 12, 1983 [DE]   Fed. Rep. of Germany...........3329133--.
```

Signed and Sealed this

Fifth Day of April, 1988

*Attest:*

DONALD J. QUIGG

*Attesting Officer*          *Commissioner of Patents and Trademarks*